Aug. 23, 1966    R. A. YATUNI    3,268,342
MOBILE MILK PROCESSING AND DISTRIBUTION
Original Filed June 9, 1961    2 Sheets-Sheet 1
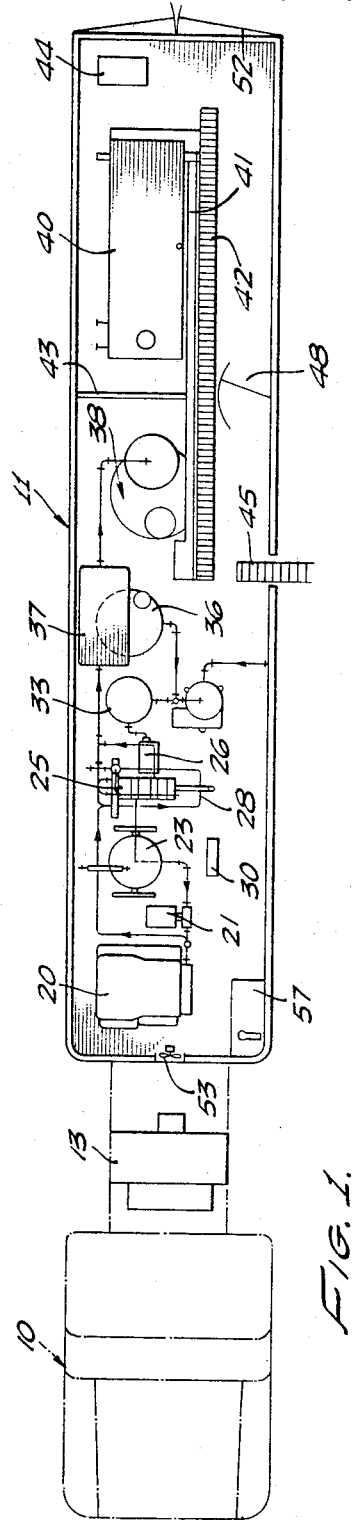
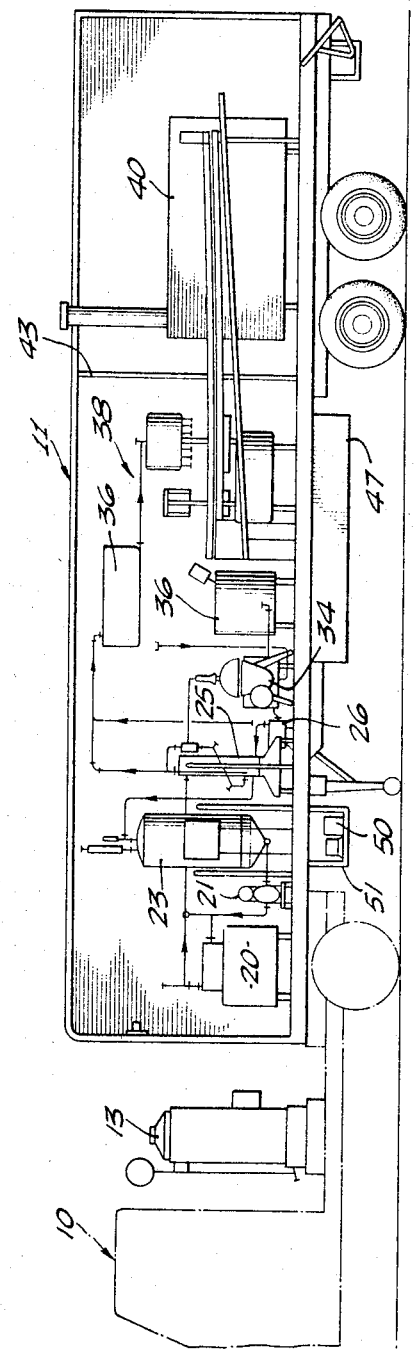
INVENTOR.
RAY A. YATUNI
BY
ATTORNEY

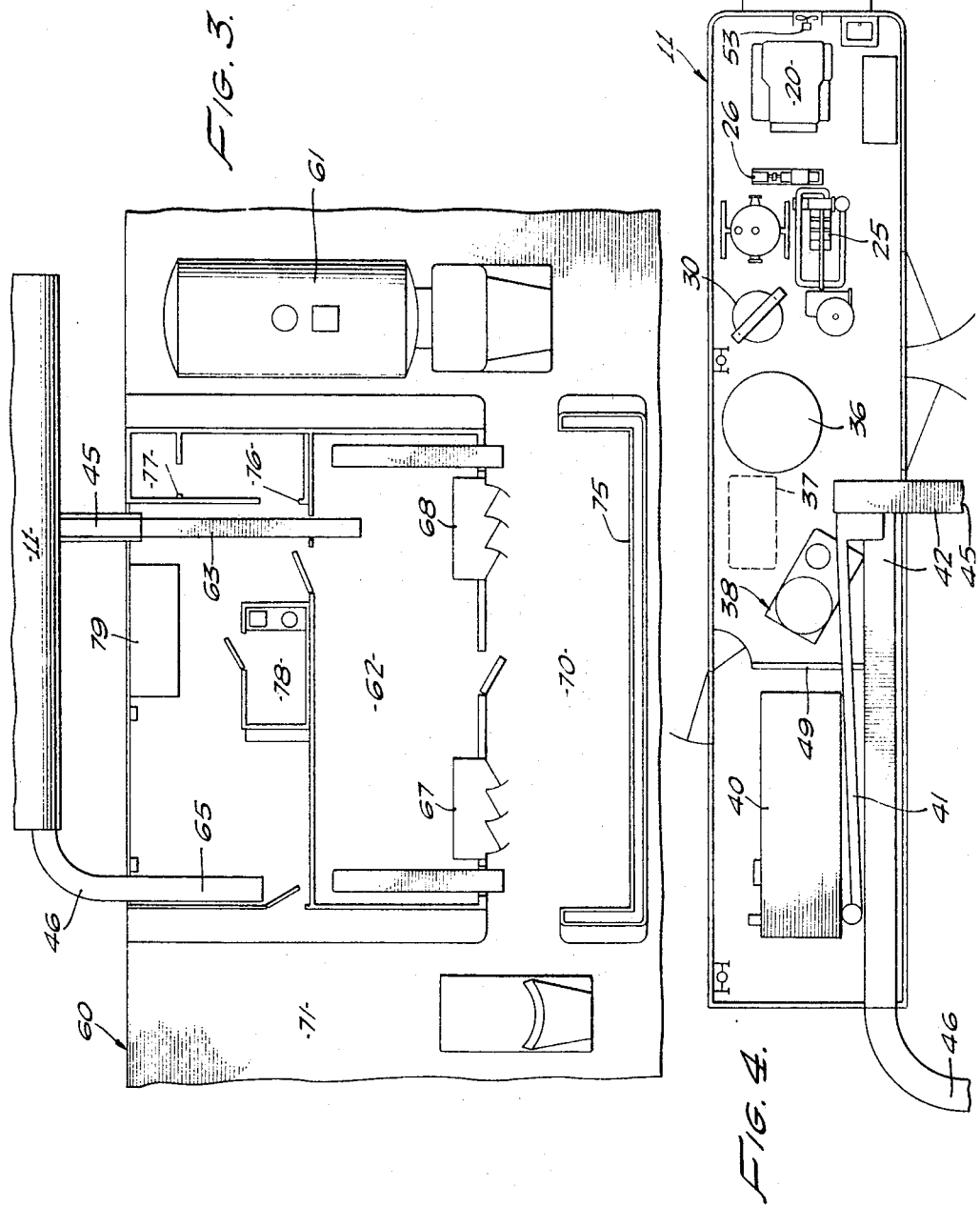

United States Patent Office 3,268,342
Patented August 23, 1966

3,268,342
MOBILE MILK PROCESSING AND DISTRIBUTION
Ray A. Yatuni, 7125 Cully St., Whittier, Calif.
Continuation of application Ser. No. 116,029, June 9, 1961. This application July 6, 1964, Ser. No. 381,943
5 Claims. (Cl. 99—171)

This application is a continuation of prior application Serial No. 116,029, filed June 9, 1961, now abandoned.

This invention relates to the art of milk processing and distribution and more particularly to a new concept wherein the milk processing plant is made mobile. The invention resides particularly in this concept and certain corollary concepts and the physical implementation of these concepts by way of particular equipment and apparatus, mobile plant lay-out, and processing and distribution facilities.

A primary object of the invention, as will become more apparent hereinafter, is to make possible substantial economies and efficiencies in the processing and distribution of milk.

Having reference to the prior art of milk processing and distribution, it has become uneconomic to deliver milk from door to door, particularly when several dairies may be delivering to residences in the same block or area. As a result, milk processing plants have been set up at drive-in sales points where the customers can drive in and pick up their milk and depart. These processing plants have been operated by crews that move from plant to plant operating each one a certain number of hours of the day to provide the processed milk which is to be delivered or dispensed from that particular station. The raw milk is delivered to such processing plants in trucks.

The foregoing described plan of operation is uneconomic from the standpoint of capital investment in processing plants and further from the fact that full utilization is not made of each plant.

The primary object of this invention is to provide a concept and plan of operation for the processing and distribution of milk which is economic, effective and efficient and to implement the concept and plan by way of particular equipment and facilities for carrying out the concept and plan.

The invention provides for a mobile milk processing plant built and assembled as an integral unit and mounted on a mobile trailer, so that instead of having three or four separate processing plants at the sales points where the customers come to get the milk there is a single plant on a mobile unit that can move from one of the distribution points to another. This very substantially reduces the investment in capital equipment and makes possible the full utilization of the processing plant. The mobile milk processing plant receives the raw milk, completely processes it and delivers it in bottles (or in cardboard containers) which are then stored in refrigerated cabinets at the sales points for delivery to the customers.

In addition to the foregoing, in its broader aspects, the invention provides for the particular design and lay-out of a building structure to serve as a distribution point and which is so laid out and/or constructed as to most effectively serve the purposes that the processed milk may be unloaded from the mobile processing plant at the distribution point; that the raw milk from a milk truck may be delivered to the mobile processing plant at the station; that the processed milk may be conveniently stored for distribution at the station; and that the customers may be most effectively serviced at the station. As will be apparent, the concept and implementation thereof makes possible a complete and, in effect, a closed cycle of operation at the distributing station.

Among other objects of the invention are to effectuate its purposes outlined above by way of particular design, plant lay-out, and constructional arrangement of equipment. The mobile unit is preferably in the form of a tractor and full trailer. One of the objects in this category is to provide an arrangement wherein the steam generating unit of the plant is transported on the tractor while the remainder of the plant is carried in the trailer. Electrical control equipment and all facilities for making connection to the plant equipment are housed in a container carried underneath the trailer. It is understood, of course, that couplings are provided to make all necessary connections to the main mobile unit including electrical, water, drain, gas and/or oil, etc. The objects include more detailed particulars as to constructional arrangements whereby the operation and equipment meet all requirements of civil codes as to sanitation, safety, etc., and furthermore, meet requirements and criteria set up by the U. S. Public Health Service.

Another object of the invention is to provide means to make it possible to completely close and hermetically seal the mobile unit upon the termination of processing and clean-up of the unit so that it remains absolutely hermetically sealed between the leaving of one place, during the time it is traveling on the road and arrival at another location. The realization of this object has the important economic advantage of eliminating the need to again undertake a cleaning process of the unit prior to the start up of processing operations at a new location. Clean-up operations may require thirty (30) minutes to an hour and may include a rinse period of perhaps five (5) to fifteen (15) minutes. This object is realized by providing means whereby the mobile unit can be completely sealed to the outside air; the equipment includes means for providing a controlled source of air pressure or a controlled source of stored high pressure inert gas such as nitrogen within the trailer so as to maintain a static pressure therein of at least a minimum of one-half inch to one inch of mercury over and above atmospheric pressure on the outside of the unit. By these means, if there is any leakage in the seals closing the trailer unit, the leakage is from the inside out rather than from the outside in with the result that there is no possibility of outside contamination, airborne dirt of any type or nature which might otherwise get within the unit during the time it is sealed.

From the foregoing, those skilled in the art will appreciate the basic nature of the concept of the invention herein. The concept embraces the factor of bulk shipment of the raw material directly to the sales station or island. That is, the product is (or may be) delivered directly from the farm or dairy where it is produced to the place where it is sold, the sales outlet or station, in bulk and there processed into the packaged unit for sales, this being done by the mobile unit. The implementation of the concept as may be seen involves the combination and inter-relationship between a mobile unit or mobile units and a stationary unit or component. The concept and its implementation herein realizes and achieves the economic result and objective of delivery of a raw product directly from point of production on the farm to the point of sales, in bulk and direct to the ultimate consumer, without having to go to an intermediate processing plant and then be redistributed. In this manner, savings have been realized by handling the product in bulk instead of handling it in a small package of a size from ten gallons to a quart or half-gallon size of the finished product. There has been realized the elimination of the handling of full cases of the product to be loaded on a delivery truck, delivering and unloading at the point of sale, loading the empty cases (or the empty cases and dirty bottles in a glass operation) and returning them to the plant and unloading them again at the plant where they are ready to again be filled with the product. The invention completely eliminates the distribution factor in merchandising the raw product from the producer to the ultimate consumer. This objective is realized by way of physical implementation of the concept as described herein by means of the particular mobile unit and the combination and inter-relation of the mobile and stationary units or components.

Further objects and additional advantages of the invention will become apparent from the detailed description, claims and annexed drawings wherein:

FIG. 1 is a plan view and section of a preferred form of mobile processing unit;

FIG. 2 is an elevational view in section of the form of the unit of FIG. 1;

FIG. 3 is a plan view and section of a preferred form of distribution station;

FIG. 4 is a plan view in section similar to that of FIG. 1 showing a modified form of mobile unit having a modified plant lay-out.

Referring now more in detail to the figures of the drawings, the equipment includes a tractor 10 and a full trailer 11. The milk processing plant includes a steam generator unit 13 which in the form of the invention shown is carried on the tractor whereas the remainder of the milk processing unit is housed within the trailer and is completely enclosed and may be sealed therewithin.

The plant lay-out of the milk processing unit is such as to effectively and efficiently make possible and carry out the objects of the invention that the milk may be fully processed in the mobile unit, bottled and/or packaged and delivered to the distribution station.

The raw milk is delivered to the mobile processing plant from a truck through connections or couplings as will be referred to more in detail presently. Numeral 20 on the figures designates a conventional homogenizer which homogenizes the milk delivered to the unit. Numeral 21 designates a pump of the positive pressure type which circulates the milk to a vacu-therm unit 23. Numeral 25 designates a heat exchanger which may have 500 gallon capacity. Numeral 26 is a centrifugal pump and numeral 28 designates a holding tube forming a part of the pasteurization apparatus for the milk. Numeral 30 designates an instrument panel for suitable control and indicating instruments.

Numeral 33 designates a balance tank and numeral 34 designates a clarifier, these units as well as those previously described being components which may be of types well known commercially and which are related or connected together in a way well known in the art. Numeral 36 designates a mix vat and numeral 37 is a surge tank. Numeral 38 designates a commercial type bottle filler and numeral 40 is a commercial type bottle washer. Numeral 41 is a bottle conveyor and numeral 42 is a gravity case conveyor. Numeral 44 designates a wash-up tank, preferably stainless steel. Numeral 45 is a discharge conveyor for discharging the bottled or packaged product from the mobile plant. With reference to the washer unit 40, it may be a conventional commercial component. There are, however, various ways that it may be used in conjunction with the mobile plant or unit. There may be provided a drop tank located beneath the trailer unit with means whereby the caustic solution from the tank in the bottle washer may drop down into the drop tank to be carried therein during the time the unit is in motion on the road. The solution would then be pumped back up into the tank of the washer unit. Preferably, however, a tank is used on top of the washer and the caustic solution is pumped up into this tank by the pump provided with the washer unit and the solution is in this closed overhead tank during the time the unit is on the road. When the trailer is parked and the plant is in operation, the solution may be drained from this overhead tank simply by opening a valve and letting it run out by gravity.

The mobile unit, as just described, corresponds, as to the manner in which the components are connected and as to the cycle of operation, with a normal type of installation of a milk processing plant. The plant lay-out, however, and the positioning of the components and their particular physical relation to each other, however, are original and are particularly designed to meet the requirements of this invention and to realize the objectives thereof. The mounting of the steam generator unit on the trailer is a particular feature of the arrangement. However, it may be said that all of the components are mounted on vibration dampening shock absorbing pads. Not only are the units on shock absorbing pads but they are integrally attached to the floor so as to be perfectly stationary at all times, the mounting being sufficiently strong to withstand emergency braking stops from speeds of approximately 30 miles per hour. It is conceivable, of course, that the steam generator could be mounted within the trailer itself but it is not practical to provide for a separate room within the trailer for the steam generator unit.

The electrical panel is within a separate compartment as designated at 47 mounted underneath the trailer unit as shown but integral with it. All of the controls within this compartment are easily accessible from outside of the unit, i.e., it is not within either of the two rooms within the trailer unit which are the processing room within the trailer and bottle washing room which is separate and fully meets the requirements of all sanitary codes. The partition between rooms is designated at 43. The control panel in the compartment 47 is provided with the necessary electrical facilities for plugging into an appropriate source of power. The centrifugal pump 26 and the utility service pump as designated at 50 are pumps which service the processing equipment. These are connected in with the rest of all the utility equipment, piping, controls, valves, etc. for the actual operation of the processing equipment. However, they are preferably mounted as shown in FIG. 2 in a pod 51 suspended beneath the trailer unit itself and made an integral part thereof. The controls and utility piping and utility equipment necessary to the processing equipment are mounted beneath the mobile unit since the room or physical space within the trailer itself is fully and effectively utilized to accommodate the other components of the other processing equipment. In this manner, the plant lay-out and structural arrangement of the integral processing unit meets the requirements of all legal codes such as Agriculture Department Codes, Department of Motor Vehicles Code, Sanitary Codes, etc.

With reference to the construction of the van or trailer, its outside construction may be aluminum or it may be steel. Preferably the walls and ceilings internally are plastic lined although this material may be anodized aluminum. Alternatively, they may be steel or aluminum painted, the main criteria being that they meet code requirements that these surfaces are of non-absorbent material, smooth and impervious to absorbing of any soil of any nature. All fixtures or facilities, similarly, are appropriately constructed to meet all legal code requirements. All of the units of the plant and their relative arrangement and positioning are such that they are capable of being cleaned in place without dismantling or disconnecting of pipes or otherwise. A door 48 is provided and end doors or closures 52. Numeral 53 designates a ventilating fan.

FIG. 4 shows a slightly modified form of plant lay-out of the mobile plant. Similar components are similarly numbered. The plant is essentially the same except for the location of certain items of equipment, piping and the location of the doors and windows in the trailer unit. The sections of the conveyor marked 45 and 46 are removable.

In this form of the invention, a removable panel section 49 is used which is installed after the equipment is put in closing up that section and permanently left that way unless it should be necessary to remove a piece of equipment. This improves the capability of completely closing and sealing the unit during the period of pressurization while not in operation and makes it possible for the unit to be fully in accord with the U.S. Public Health Service criteria relative to the control over all openings so that considering all climatic conditions, it is possible to hold temperatures within an operating range suitable to the comfort of the operators and to also have dust control to prevent or inhibit dust from getting into the unit and to similarly provide for fly control inhibiting conditions within the processing unit.

The mobile plants, as so far described, are for an operation in which the processed milk is bottled in glass bottles. The invention contemplates further slightly modified plant lay-out to accommodate it to the packaging of the milk in cardboard containers. The fillers for this type of operation are, of course, slightly different components resulting in a slightly different plant lay-out and arrangement of parts than that shown in FIG. 4. In this type of installation, there would be no requirement for a dividing wall separating the rooms and isolating the filling unit such requirement prevailing only in a glass operation so as to provide a separate room for bottle washing and bottle filling. In the cardboard carton operation, there is, of course, no bottle washing operation.

A particular feature of the mobile plants, as so far described, is a means providing capability to completely close and hermetically seal the unit on the termination of processing and clean-up so that it is absolutely hermetically sealed between the leaving of one station, during the time it is traveling on the road, and the arrival at another station. This capability and characteristic eliminates the need to again clean the unit prior to start up at another station. This, of course, is a definite economic advantage from the standpoint of saving of time as has been referred to in the foregoing. This capability is achieved in that all of the doors and windows of the unit are provided with seals so that they are pressure tight when closed. Numeral 57 designates a controlled source of sanitized air pressure which may be a compressor or centrifugal blower having adequate capacity to produce a pressure within the sealed trailer which is at least a minimum of one-half inch to one inch of mercury over and above the atmospheric pressure on the outside of the unit. As an alternative to this pressure source, there may be provided an adequately controlled source of stored high pressure inert gas such as nitrogen, for example. The gas from this source is released by way of an automatic valve embodied in the unit which maintains the above stated pressure differential between the interior of the trailer and the outside atmosphere. This valve may be of a type known in the art which maintains a predetermined differential between the pressure within the trailer and the exterior atmosphere and may be one of the valves of the general type now in use for maintaining cabin pressure in pressurized aircraft cabins. The purpose and effect of the hermetic sealing and pressurizing has been described in the foregoing. When sealed and pressurized the opening at fan 53 is similarly closed and sealed by suitable means. It is to be appreciated that the inherent nature of the concept of this invention, i.e., the provision of an integral processing unit so constructed and arranged that it can be made mobile in a trailer makes possible the realization of the concept of completely sealing and pressurizing the mobile plant while traveling. Not only is the implementation of this concept made possible but it can be very effectively realized in ways set forth in the foregoing.

The mobile plant or plants as described in the foregoing are utilized in combination with a distribution or cycling station of particular construction, arrangement and lay-out whereby the purposes and objectives of the invention are fully realized. FIG. 3 shows a preferred form of such distributing station. The station shown in FIG. 3 is typical of a preferred lay-out for a glass operation, i.e., an operation in which the milk is distributed in glass bottles. The station is designated as a whole by the numeral 60 in FIG. 3. The processing van or trailer 11 is parked at one side of the station with the conveyors 45 and 46 positioned for delivering the packaged milk to the station and receiving dirty, empty bottles therefrom. Numeral 61 designates a raw milk truck parked at the station in a position to be directly connected or coupled to the processing trailer in the manner described in the foregoing by way of quick connect and disconnect couplings. It may be seen, therefore, that the milk may be delivered raw in the tanker direct to the station and then pumped into the mobile processing unit. After processing in the unit, the packaged milk is directly delivered to the sales or dispensing station.

The concept is not limited, however, to that of the use of a tanker at the station since it is also feasible to use a permanent storage tank at the sales station for raw milk. This may be positioned at any convenient point in the station as will be referred to more in detail presently. In this type of installation, the tanker delivers milk in bulk to such a tank and then proceeds. The mobile processing unit then connects up to this tank containing the raw product.

To proceed now more in detail with the station as shown in FIG. 3, preferably canopy covers may be provided over the conveyors 45 and 46. The structure 60 is particularly designed and laid out to effectuate the operation described in the foregoing. The structure is provided with a milk storage box or compartment 62 which is refrigerated. The filled containers are brought inwardly on a conveyor 63 and the empty, dirty bottles returned by the customers are carried back to the van 11 on a conveyor 65. The compartment 62 is provided with dispensing counters and windows as designated at 67 and 68 for dispensing the product to customers in a vestibule 70. Numeral 71 is a drive-way at the side to accommodate the customers who can drive up and return the empties and then enter the vestibule 70 to have the fresh packaged product delivered to them. The vestibule 70 is enclosed by wall 75. The station, as shown, is generally rectangular and structurally may embody any particular type of building materials. There is provided a locker room 76; toilet facilities 77; and an office and laboratory 78. An ice making machine 79 may be provided for refrigeration purposes in the storage compartment 62.

From the foregoing, those skilled in the art will now readily observe that the invention achieves and realizes all of the objects and advantages outlined in the foregoing and that it clearly accomplishes its economic purpose. The foregoing disclosure is representative of preferred ways and means of implementing the basic concept of the invention and is to be interpreted in an illustrative rather than a limiting sense. Various modifications and variations may be made in the manner of implementation of the concept, all well within the realm and scope of the invention. Some of these variations and alternatives have been referred to in the foregoing. Additionallyy, it may be pointed out that the sales station in FIG. 3 is representative of one set-up for a glass operation, i.e., distribution of milk in glass bottles. It readily adapts itself to minor variations as necessary to adapt it to the distribution of the product in cardboard containers. The station may, of course, also be readily adapted to utilization at a supermarket. In such operation, the mobile unit will park adjacent to the rear dock of the market and discharge the packaged product directly into a milk storage box from which it would then be placed into the ordinary serving boxes in the supermarket. As explained in the foregoing, a storage tank may be provided for example, within the warehouse adjacent the processing area or a tanker port may be provided adjacent to the mobile unit parking station to facilitate receiving raw product directly from the portable tanker.

In the light of the foregoing, the invention is to be accorded the full scope of the claims appended hereto.

What is claimed is:

1. The method of handling raw milk, comprising the steps of placing a milk processing and packaging plant for processing raw milk on a mobile unit, delivering raw milk in tankers from the source of supply to various distribution stations located remotely from the source of supply of raw milk, moving the mobile unit from one to the other of said distribution stations, delivering raw milk from a tanker to the mobile unit at a distribution station and discharging processed milk in containers from the mobile unit at the distribution station.

2. The method of handling raw milk, comprising the steps of placing a milk processing and packaging plant for processing raw milk on a mobile unit, delivering raw milk in tankers from the source of supply to various distribution stations located remotely from the source of supply of raw milk, moving the mobile unit from one to another of said distribution stations, making connections for milk transfer between a milk tanker and the mobile unit at each distribution station, delivering raw milk from a tanker to the mobile unit at a distribution station, and discharging processed milk in containers from the mobile unit at a distribution station, while raw milk is being delivered to the mobile unit.

3. A method as in claim 1, including carrying out clean-up operations in the mobile unit after a processing run, and completely hermetically sealing the mobile unit while traveling between one distribution station and another.

4. A method as in claim 3 including pressurizing the interior of the sealed unit during travel from one distribution station to another.

5. The method of handling raw milk, comprising the steps of placing a milk processing and packaging plant for processing raw milk on a mobile unit, delivering raw milk in tankers from the source of supply to various distribution stations located remotely from the source of supply of raw milk, moving the mobile unit from one to another of said distribution stations, delivering raw milk from a tank to the mobile unit at a distribution station and discharging processed milk in containers from the mobile unit at the distribution station.

References Cited by the Examiner

UNITED STATES PATENTS

| | | | |
|---|---|---|---|
| 2,153,542 | 4/1939 | Ball | 99—184 |
| 2,230,158 | 1/1941 | Crawford | 119—37 |
| 2,616,809 | 11/1952 | Graves | 99—183 |
| 3,088,827 | 5/1963 | Kaufman | 99—80 |

OTHER REFERENCES

Department of the Interior, Bureau of Fisheries, Memo S-349, January 27, 1940, "Packing Crab Meat in Japan," pp. 1 to 6.

A. LOUIS MONACELL, *Primary Examiner.*

M. W. GREENSTEIN, *Assistant Examiner.*